(12) United States Patent
Okada et al.

(10) Patent No.: US 11,042,759 B2
(45) Date of Patent: Jun. 22, 2021

(54) ROADSIDE OBJECT RECOGNITION APPARATUS

(71) Applicant: DENSO CORPORATION, Kariya (JP)

(72) Inventors: Masaya Okada, Nisshin (JP); Shunya Kumano, Nisshin (JP); Takumi Uematsu, Kariya (JP); Mitsuhiro Tokimasa, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 16/216,239

(22) Filed: Dec. 11, 2018

(65) Prior Publication Data

US 2019/0180117 A1 Jun. 13, 2019

(30) Foreign Application Priority Data

Dec. 13, 2017 (JP) .............. JP2017-238208

(51) Int. Cl.
*G06K 9/00* (2006.01)
*G01S 7/41* (2006.01)
*G01S 13/86* (2006.01)
*G01S 13/931* (2020.01)
*G05D 1/02* (2020.01)
(Continued)

(52) U.S. Cl.
CPC ....... *G06K 9/00798* (2013.01); *B60W 40/072* (2013.01); *G01S 7/4026* (2013.01); *G01S 7/411* (2013.01); *G01S 13/867* (2013.01); *G01S 13/931* (2013.01); *G05D 1/0246* (2013.01); *G05D 1/0257* (2013.01); *B60W 2420/42* (2013.01); *B60W 2420/52* (2013.01); *G01S 2013/93271* (2020.01); *G05D 2201/0213* (2013.01)

(58) Field of Classification Search
CPC ............ G06K 9/00798; B60W 40/072; G01S 7/4026; G01S 7/411; G01S 13/867; G01S 13/931; G05D 1/0246; G05D 1/0257
USPC ........................................................ 382/104
See application file for complete search history.

(56) References Cited

U.S. PATENT DOCUMENTS

2011/0260909 A1* 10/2011 Ogawa .................. G01S 7/4876
342/70
2012/0081544 A1* 4/2012 Wee ...................... G01S 17/931
348/140
2013/0218448 A1 8/2013 Suzuki
(Continued)

FOREIGN PATENT DOCUMENTS

JP 5402983 B2 1/2014

*Primary Examiner* — Stephen P Coleman
(74) *Attorney, Agent, or Firm* — Maschoff Brennan

(57) ABSTRACT

A roadside object recognition apparatus recognizes a roadside object that is present on a travel route on which an own vehicle travels. The roadside object is used for driving control of the vehicle. In the roadside object recognition apparatus, a reflection point acquiring unit acquires, using a radar that emits electromagnetic waves, a reflection-point group of reflection points of the electromagnetic waves reflected by an object that is present on the travel route. An image acquiring unit acquires an image of the travel route using a camera. A reflection point correcting unit corrects the reflection-point group by removing an erroneous reflection point that is determined to be highly likely not to be a reflection point of a roadside object from the reflection-point group through image processing of the image. A shape recognizing unit recognizes a shape of the roadside object using the corrected reflection-point group.

14 Claims, 13 Drawing Sheets

(51) Int. Cl.
*B60W 40/072* (2012.01)
*G01S 7/40* (2006.01)

(56) References Cited

U.S. PATENT DOCUMENTS

2018/0209801 A1* 7/2018 Stentz ................ B60W 60/0011
2019/0035057 A1* 1/2019 Naserian ................ G06T 5/002

* cited by examiner

<METHOD 1> SETTING OF TRAVEL ROAD AREA USING TRAVEL ROAD BOUNDARY LINES

<METHOD 2> SETTING OF TRAVEL ROAD AREA USING OTHER-VEHICLE LOCUS

<u>⟨METHOD 1+2⟩ SETTING OF TRAVEL ROAD AREA USING TRAVEL ROAD BOUNDARY LINES AND OTHER-VEHICLE LOCUS</u>

SETTING OF TRAVEL ROAD AREA USING RECOGNIZED OVERHEAD OBJECT (1)

SETTING OF TRAVEL ROAD AREA USING RECOGNIZED OVERHEAD OBJECT (2)

REMOVAL OF REFLECTION POINT USING TEMPORARY BOUNDARY LINE

ROADSIDE OBJECT RECOGNITION APPARATUS

CROSS-REFERENCE TO RELATED APPLICATION

This application is based on and claims the benefit of priority from earlier Japanese Patent Application No. 2017-238208, filed Dec. 13, 2017, the description of which is incorporated herein by reference.

BACKGROUND

Technical Field

The present disclosure relates to a technology for recognizing a roadside object that is present on a travel route on which a vehicle travels, the roadside object being used for driving control of the own vehicle.

Related Art

In automatic driving of a vehicle, a shape (travel road shape) of a travel road on which an own vehicle travels is recognized, and driving control is performed such that the own vehicle travels along the recognized travel road shape. For the travel road shape to be recognized, the shapes of a plurality of objects that can be used to determine the travel road shape are recognized through use of various types of onboard sensors, such as cameras and radars. For example, such objects include travel road boundary lines (lane markers) such as white lines and roadside objects such as guardrails.

Japanese Patent Publication No. 5402983 describes a technology for recognizing a roadside object using a radar. A plurality of reflection points are obtained through measurement performed by the radar. Therefore, the shape of the roadside object can be recognized as a result of the plurality of reflection points being successively connected. However, the reflection points from an object other than the roadside object are present as noise points among the reflection points. Therefore, a process for excluding such noise points is desired. Japanese Patent Publication No. 5402983 discloses a technology in which the reflection points that are present between a preceding vehicle recognized by the radar and an own vehicle are excluded as the noise points.

In the case in Japanese Patent Publication No. 5402983, the noise points cannot be excluded when the preceding vehicle is not detected by the radar. For recognition of the shape of a roadside object, a technology for removing noise points of a radar under various circumstances is desired.

SUMMARY

An exemplary embodiment provides a roadside object recognition apparatus that recognizes a roadside object that is present on a travel route on which a vehicle travels, for use in driving control of the own vehicle. The roadside object recognition apparatus includes: a reflection point acquiring unit that acquires, using a radar that emits electromagnetic waves, a reflection-point group of reflection points of the electromagnetic waves reflected by an object that is present on the travel route; an image acquiring unit that acquires an image of the travel route using a camera; a reflection point correcting unit that corrects the reflection-point group by removing an erroneous reflection point that is determined to be highly likely not to be a reflection point of the roadside object from the reflection-point group through image processing of the image; and a shape recognizing unit that recognizes a shape of the roadside object using the corrected reflection-point group.

As a result of the roadside object recognition apparatus, the erroneous reflection point that is highly likely not to be the reflection point of the roadside object is removed from the reflection-point group through image processing of the image of the travel route. Therefore, noise points can be appropriately removed. The likelihood of the roadside object being erroneously recognized can be reduced.

DESCRIPTION OF THE EMBODIMENTS

A. First Embodiment

Figure 1:
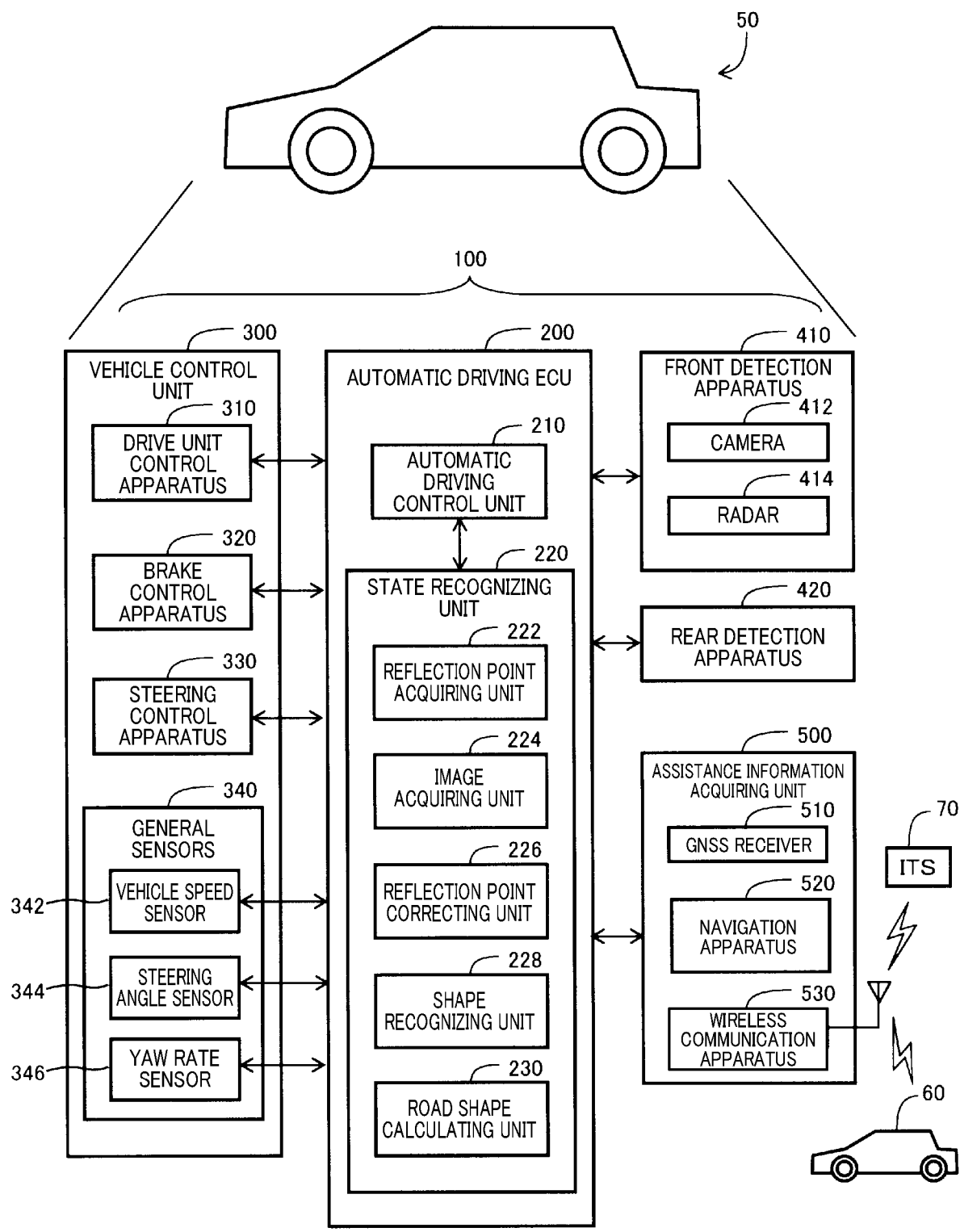
FIG. 1 is a block diagram of a configuration of an automatic driving control system according to a first embodiment.

As shown in FIG. 1, a vehicle 50 according to a first embodiment includes an automatic driving control system 100 that corresponds to a vehicle control system. The automatic driving control system 100 includes an automatic driving electronic control unit (ECU) 200, a vehicle control unit 300, a front detection apparatus 410, a rear detection apparatus 420, and an assistance information acquiring unit 500. In the present description, the vehicle 50 is also referred to as an "own vehicle 50."

The automatic driving ECU 200 is a circuit that includes a central processing unit (CPU) and a memory. The automatic driving ECU 200 actualizes the respective functions of an automatic driving control unit 210 and a state recognizing unit 220 by running a computer program that is stored in a non-volatile storage medium. A part of the functions of the automatic driving ECU 200 may be implemented by a hardware circuit.

The state recognizing unit 220 recognizes the driving states of the own vehicle 50 and an other vehicle 60, and the surrounding environment using various types of information and detection values that are provided by the front detection apparatus 410, the rear detection apparatus 420, the assistance information acquiring unit 500, and general sensors 340.

According to the present embodiment, the state recognizing unit 220 includes a reflection point acquiring unit 222, an image acquiring unit 224, a reflection point correcting unit 226, a shape recognizing unit 228, and a travel road shape calculating unit 230. Of the foregoing, the reflection point acquiring unit 222, the image acquiring unit 224, the reflection point correcting unit 226, and the shape recognizing unit 228 as a whole configure a roadside object recognition apparatus that recognizes a roadside object that is present on a travel route on which the own vehicle 50 travels. In other words, according to the present embodiment, the automatic driving ECU 200 functions as the roadside object recognition apparatus.

The reflection point acquiring unit 222 acquires a reflection-point group using a radar 414 of the front detection apparatus 410. The reflection-point group includes reflection points of electromagnetic waves (e.g., radio waves or lights) reflected by an object that is present on the travel route. The image acquiring unit 224 acquires an image of the travel route using a camera 412.

The reflection point correcting unit 226 corrects the reflection-point group acquired by the reflection point acquiring unit 222 by removing the reflection points (erroneous reflection points, noise points) determined to be highly likely not to be the reflection points (actual reflection points) of a roadside object from the reflection-point group, through image processing performed on the image captured by the camera 412. Details of this correction will be further described hereafter. The reflection point correcting unit 226 also provides a function for recognizing boundary lines and other objects using the images captured by the camera 412 and the results of measurement by the radar 414.

The shape recognizing unit 228 recognizes the shape of the roadside object using the reflection-point group corrected by the reflection point correcting unit 226. More specifically, the shape recognizing unit 228 calculates a two-dimensional shape of the roadside object, such as a guardrail. Here, the "two-dimensional shape" refers to a shape that appears in a planar view of the own vehicle 50 and the travel route thereof.

The travel road shape calculating unit 230 calculates a shape (travel road shape) of the travel road on which the own vehicle 50 travels using the shape of the roadside object recognized by the shape recognizing unit 228. However, for calculation of the travel road shape, the recognition results regarding travel road boundary lines, such as white lines, are preferably also used in addition to the roadside object.

The vehicle control unit 300 is a section that performs various types of control for driving the vehicle 50. The vehicle control unit 300 is used for both automatic driving and manual driving. The vehicle control unit 300 includes a drive unit control apparatus 310, a brake control apparatus 320, a steering angle control apparatus 330, and the general sensors 340.

The drive unit control apparatus 310 provides a function for controlling a drive unit (not shown) that drives the wheels of the vehicle 50. At least one of a plurality of motors including an internal combustion engine and an electric motor can be used as the drive unit for the wheels.

The brake control apparatus 320 performs brake control of the vehicle 50. For example, the brake control apparatus 320 is configured as an electronically controlled brake system (ECB).

The steering angle control apparatus 330 controls a steering angle of the wheels of the vehicle 50. The "steering angle" refers to an average steering angle of the two front wheels of the vehicle 50. For example, the steering angle control apparatus 330 is configured as an electric power steering system (EPS).

The general sensors 340 include a vehicle speed sensor 342, a steering angle sensor 344, and a yaw rate sensor 346. The general sensors 340 are general sensors that are required for driving the vehicle 50. The general sensors 340 include sensors that are used in either of automatic driving and manual driving.

The front detection apparatus 410 acquires information related to various types of objects, such as objects and road facilities (such as traffic lanes, intersections, and traffic lights), that are present ahead of the own vehicle 50. The front detection apparatus 410 uses onboard sensors to acquire the information. According to the present embodiment, the front detection apparatus 410 includes the camera 412 and the radar 414.

A monocular camera or a stereo camera can be used as the camera 412. In addition, the camera 412 is preferably a color camera to enable differentiation between the colors of the objects (such as differentiation between a white travel road boundary line and a yellow travel road boundary line). Various types of radars that emit electromagnetic waves (e.g., radio waves or lights), such as a light detection and ranging (LIDAR) apparatus that emits light or a radar (such as a millimeter-wave radar) that emits radio waves, can be used as the radar 414.

The rear detection apparatus 420 acquires information related to various types of objects, such as objects and road facilities, that are present to the rear of the own vehicle 50. The rear detection apparatus 420 can also be configured to include onboard sensors similar to those of the front detection apparatus 410.

The assistance information acquiring unit 500 acquires various types of assistance information for automatic driving. The assistance information acquiring unit 500 includes a global navigation satellite system (GNSS) receiver 510, a navigation apparatus 520, and a wireless communication apparatus 530.

The GNSS receiver 510 determines a current position (longitude and latitude) of the own vehicle 50 based on navigation signals received from satellites configuring the GNSS. The navigation apparatus 520 provides a function for determining a predicted travel route for automatic driving based on a destination and the own vehicle position detected by the GNSS receiver 510. In addition to the GNSS receiver 510, other sensors, such as a gyro sensor, may be used to determine and correct the predicted travel route.

The wireless communication apparatus 530 is capable of exchanging state information related to the state of the own vehicle 50 and the state of the surrounding environment through wireless communication with an intelligent transport system 70. The wireless communication apparatus 530 is also capable of exchanging the state information through inter-vehicle communication with the other vehicle 60, and road-vehicle communication with a roadside transceiver that is set in a road facility.

The assistance information acquiring unit 500 may acquire some pieces of information related to the driving state of the own vehicle 50 using the state information acquired through such wireless communication. The various types of assistance information acquired by the assistance information acquiring unit 500 are transmitted to the automatic driving ECU 200.

In the present description, "automatic driving" refers to driving in which all of drive unit control, brake control, and steering angle control are automatically performed without the driver performing driving operations. Therefore, in automatic driving, an operation state of the drive unit, an operation state of the brake mechanism, and the steering angle of the wheels are automatically determined. "Manual driving" refers to driving in which the driver performs an operation (stepping on an accelerator pedal) for drive unit control, an operation (stepping on a brake pedal) for brake control, and an operation (rotation of a steering wheel) for steering angle control.

The automatic driving control unit 210 performs control for automatic driving of the own vehicle 50 using the various states recognized by the state recognizing unit 220. Specifically, the automatic driving control unit 210 transmits a drive indicator value to the drive unit control apparatus 310. The drive indicator value indicates the operation state of the drive unit (engine and motor).

The automatic driving control unit 210 also transmits a brake indicator value to the brake control apparatus 320. The brake indicator value indicates the operation state of the brake mechanism. The automatic driving control unit 210 also transmits a steering angle indicator value to the steering angle control apparatus 330. The steering angle indicator value indicates the steering angle of the wheels. The control apparatuses 310, 320, and 330 perform control of the respective mechanisms to be controlled based on the provided indicator values. For example, the various functions of the automatic driving control unit 210 can be implemented through artificial intelligence using machine learning such as deep learning.

The automatic driving control system 100 has numerous electronic apparatuses including the automatic driving ECU 200. The plurality of electronic apparatuses are connected to each other via an onboard network such as a controller area network (CAN).

Figure 2:
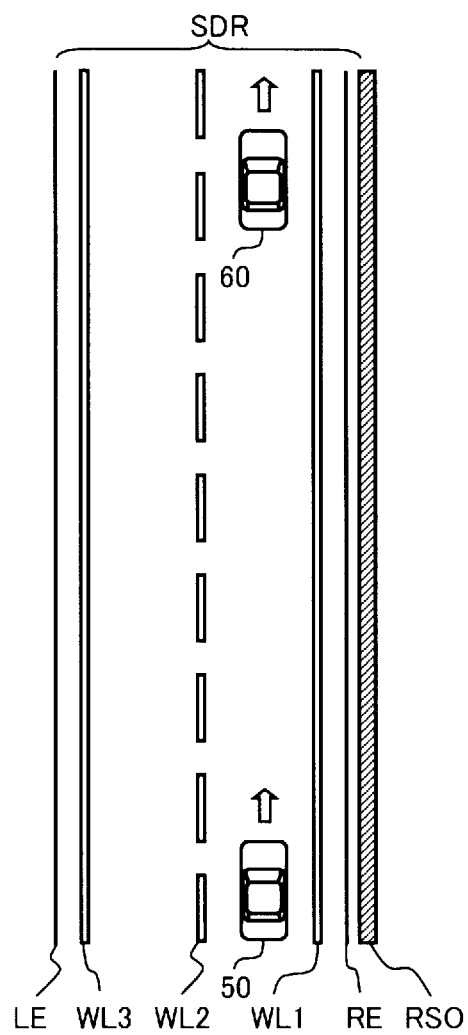
FIG. 2 is an explanatory diagram of an example of a plurality of objects associated with a travel road shape according to the first embodiment.

As shown in FIG. 2, when the own vehicle 50 travels along a travel route SDR, the state recognizing unit 220 can recognize a plurality of objects that are associated with the travel road shape. Here, a left edge LE and a right edge RE of the road, travel road boundary lines WL1, WL2, and WL3, and a roadside object RSO are shown as the objects that can be recognized by the state recognizing unit 220. The two travel road boundary lines WL1 and WL3 are solid white lines. The travel road boundary line WL2 in the center is a broken white line. For example, the roadside object RSO is a guardrail. These objects can be recognized through use of images captured by the camera 412 and detection results from the radar 414.

A preceding other vehicle 60 may be driving ahead of the own vehicle 50. The presence and travel locus (travel trajectory) of the other vehicle 60 such as this can also be recognized through use of the images captured by the camera 412 and the detection results from the radar 414. A false boundary line FWL that is easily erroneously recognized as a travel road boundary line is present on the road surface near the center travel road boundary line WL2.

Hereafter, a process for recognizing the roadside object RSO as the object used to calculate the shape (travel road shape) of the travel road on which the own vehicle 50 travels will be described. In addition to the guardrail, other objects that are present on the shoulder of the road, such as a curbstone or a row of poles on the shoulder of the road, can be recognized as the roadside object.

Figure 3:
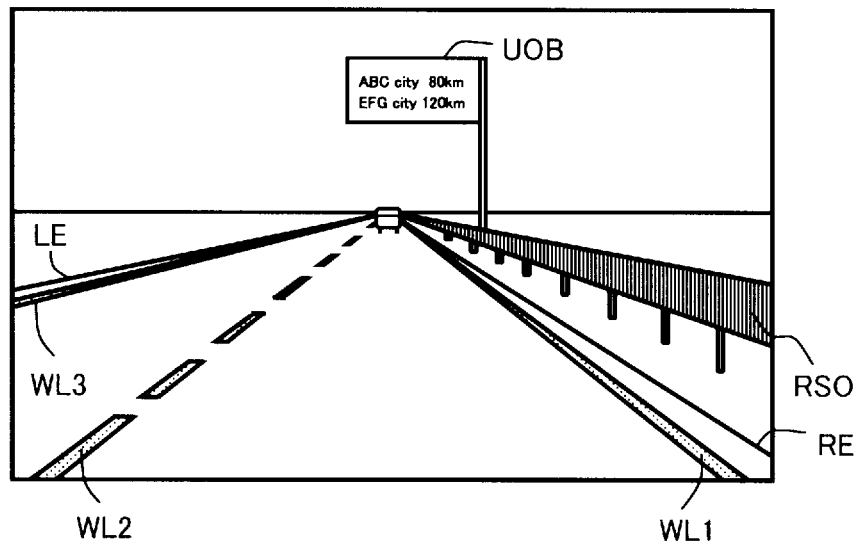
FIG. 3 is an explanatory diagram of an example of an image captured by a camera.

As shown in FIG. 3, the image captured by the camera 412 includes the left edge LE and the right edge RE of the road, the travel road boundary lines WL1, WL2, and WL3, and the roadside object RSO shown in FIG. 2. The image further includes an overhead object (upper object) UOB that is present above the own vehicle 50. In this example, the overhead object UOB is a road sign. However, the image may include an elevated structure, such as an overpass or a pedestrian bridge, as the overhead object UOB.

Here, "above the own vehicle 50" means that the position of the overhead object UOB in a vertical direction is higher than the own vehicle 50 and does not mean that the overhead object UOB is required to be present directly above the own vehicle 50. The radar 414 is capable of detecting the reflection points of the electromagnetic waves on the roadside object RSO and the overhead object UOB. Therefore, the reflection point acquiring unit 222 may acquire a reflection-point group that includes not only the reflection points of the roadside object RSO, but also the reflection points of the overhead object UOB.

The reflection points of the overhead object UOB become noise when the roadside object RSO is being recognized. Therefore, the reflection points of the overhead object UOB should be removed from the reflection-point group. According to the first embodiment, a travel road area that includes the travel road on which the own vehicle 50 travels is set in the image captured by the camera 412. The reflection points present within the travel road area are removed from the reflection-point group. The details of this process will be described hereafter.

Figure 4:
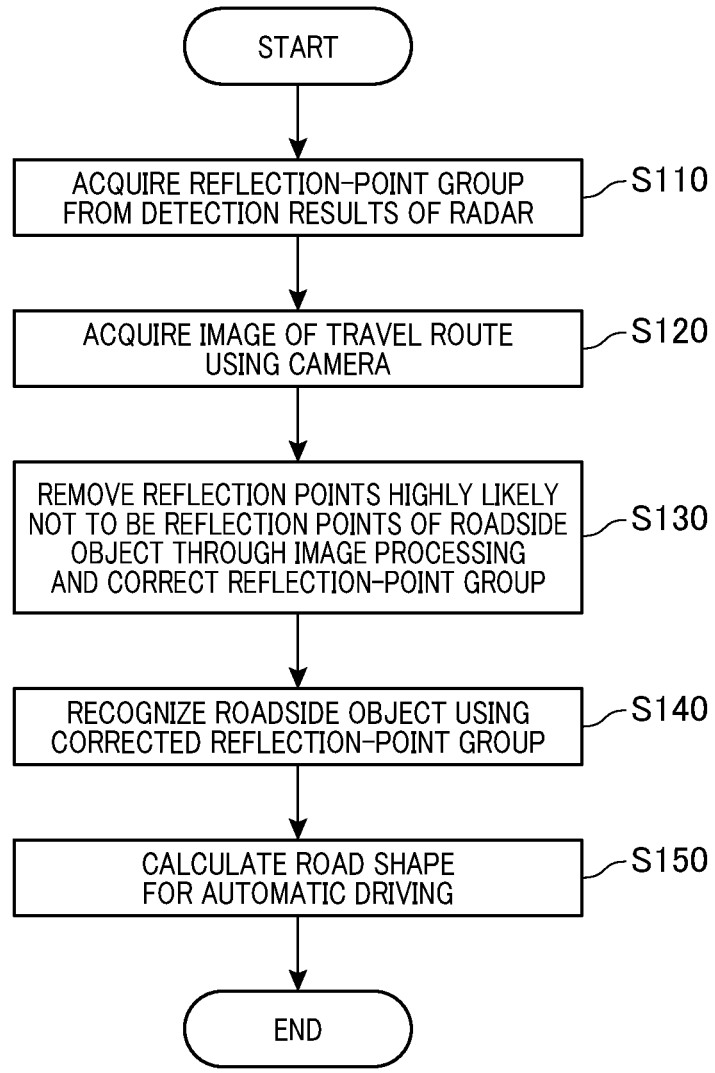
FIG. 4 is a flowchart of a roadside object recognition process.

As shown in FIG. 4, in the process for recognizing the roadside object RSO, first, at step S110, the reflection point acquiring unit 222 acquires the reflection-point group from the detection results of the radar 414. As described above, the reflection-point group may include not only the reflection points of the roadside object RSO, but also the reflection points of the overhead object UOB.

At step S120, the image acquiring unit 224 acquires an image of the travel route using the camera 412. For example, the image is an image such as that shown in FIG. 3, described above.

At step S130, the reflection point correcting unit 226 corrects the reflection-point group by removing the reflection points that are highly likely not to be the reflection points of the roadside object RSO through image processing of the image captured by the camera 412. The positions of the reflection points acquired through measurement by the radar 414 are converted to positions in the image captured by the camera 412 by a predetermined coordinate transformation matrix.

According to the first embodiment, in the process at step S130, the travel road area including the travel road on which the own vehicle 50 travels is set by image processing. The reflection points present in the travel road area are determined to be highly likely not to be the reflection points of the roadside object RSO and are removed from the reflection-point group. For example, this process can be performed through use of at least one of three methods, described below.

<Method 1 (FIG. 5)> A travel road area RLA1 of the own vehicle 50 is set with reference to the travel road boundary lines WL1 to WL3. Reflection points RP8 and RP9 that are present in the travel road area RLA1 are then removed from the reflection-point group.

<Method 2 (FIG. 6)> A travel road area RLA2 of the own vehicle 50 is set with reference to the locus of a preceding other vehicle 61. The reflection points RP8 and RP9 that are present in the travel road area RLA2 are then removed from the reflection-point group.

<Method 3 (FIG. 7)> A travel road area RLA3 of the own vehicle 50 is set with reference to the road edge RE. The reflection points RP8 and RP9 that are present in the travel road area RLA3 are then removed from the reflection-point group.

Specific examples of the above-described methods 1 to 3 in a case in which the roadside object RSO to be recognized is present on a right side of the own vehicle 50 will be described below. In a case in which the roadside object RSO is present on a left side of the own vehicle 50, the description below is made similarly applicable by "left" and "right" in the description below being reversed.

Figure 5:
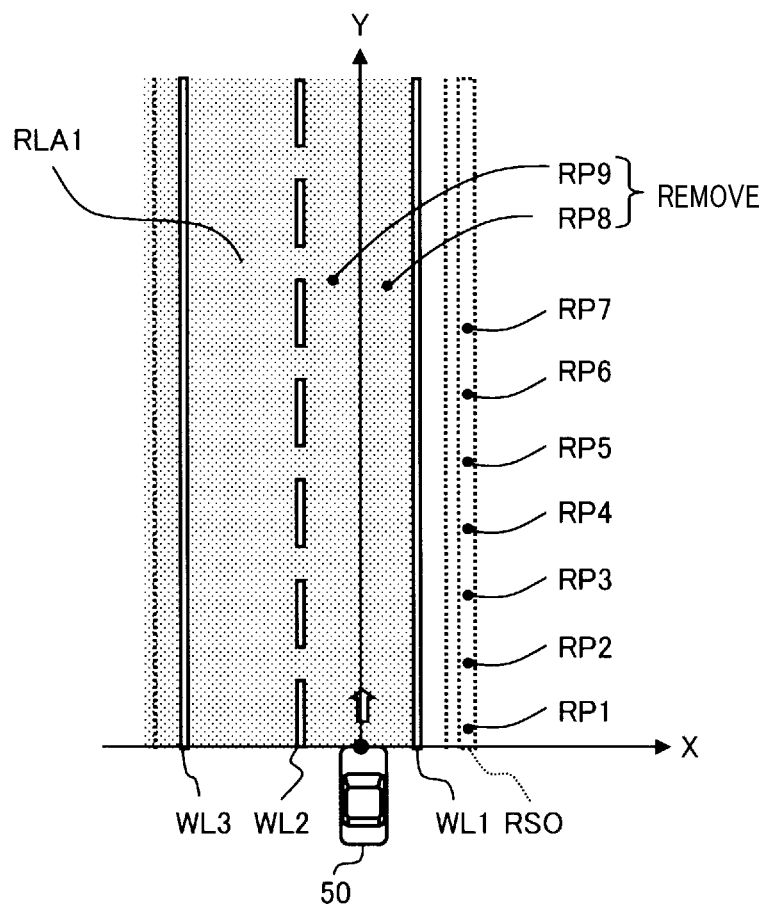
FIG. 5 is an explanatory diagram of a setting example of a travel road area using travel road boundary lines.

In the example in FIG. 5, the travel road boundary lines WL1 to WL3 are recognized through image processing of the image captured by the camera 412. In this case, an area on the left side of the travel road boundary line WL1 that is present furthest to the right among the travel road boundary lines recognized on the right side of the own vehicle 50 is set as the travel road area RLA1. The travel road area RLA1 is shaded with dots. At this time, the reflection point correcting unit 226 removes the reflection points RP8 and RP9 that are present in the travel road area RLA1 from the reflection-point group. As a result, the reflection-point group of the reflection points RP1 to RP7 of the roadside object RSO can be accurately recognized.

FIG. 5 shows a two-dimensional coordinate system in which a vehicle-width direction is an X axis and a direction perpendicular to the X axis is a Y axis, with a reference position of the own vehicle 50 as a point of origin. The vehicle-width direction X is also referred to as a "lateral direction." The position of the reflection point is prescribed by an XY-coordinate value. In addition, the travel road boundary lines WL1 to WL3 are recognized as two-dimensional shapes on the XY coordinate system. This similarly applies to the other-vehicle travel locus and the road edge described hereafter.

Figure 6:
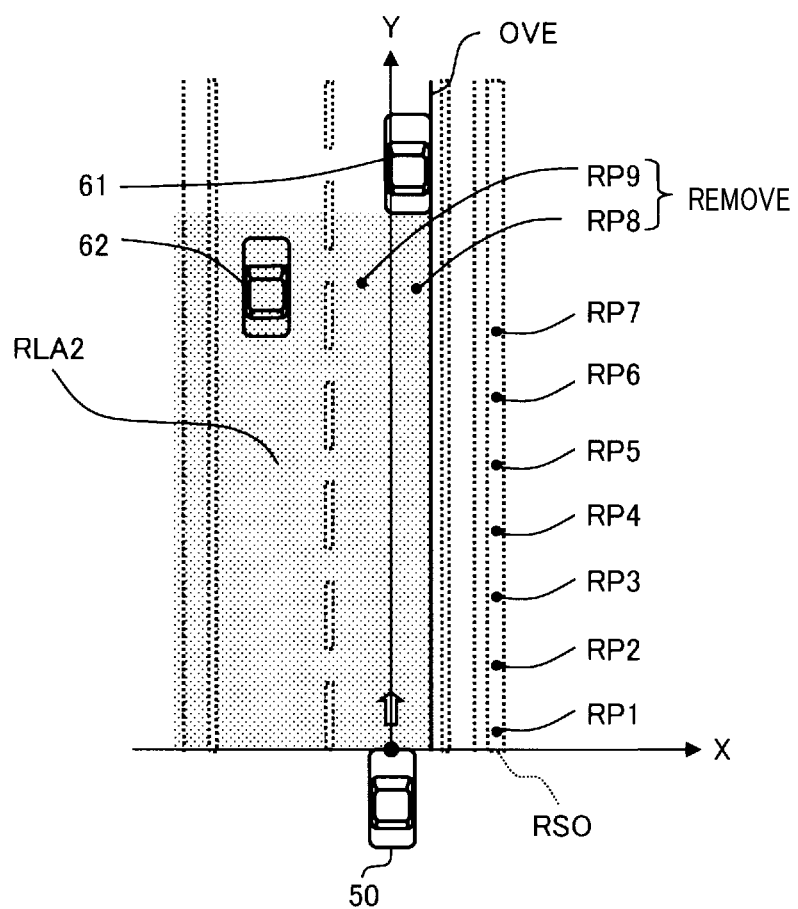
FIG. 6 is an explanatory diagram of a setting example of a travel road area using an other vehicle locus.

In the example in FIG. 6, at least one of preceding other vehicles 61 and 62 are recognized through image processing on the image captured by the camera 412. In this case, an area on the left side of a right-edge position of the locus of the other vehicle 61 that is present furthest to the right among the other vehicles recognized on the right side of the own vehicle 50 is set as the travel road area RLA2.

Here, "the other vehicles 61 recognized on the right side of the own vehicle 50" refers to a vehicle of which a left-right (lengthwise) center line of the vehicle is present on the right side of the left-right center line of the own vehicle 50. In addition, "the locus of the other vehicle 61" refers to a locus of a right edge OVE of the other vehicle 61 that travels, and a locus that is recognized from a plurality of images that are captured in time-series.

When the travel road area RLA2 is set using the locus of the other vehicle 61, the range of the travel road area RLA2 along an advancing direction of the own vehicle 50 is preferably set so as to extend to a position at the rear end of the other vehicle 61. The reflection point correcting unit 226 removes the reflection points RP8 and RP9 that are present in the travel road area RLA2 from the reflection-point group. As a result, the reflection-point group of the reflection points RP1 to RP7 of the roadside object RSO can be accurately recognized.

Figure 7:
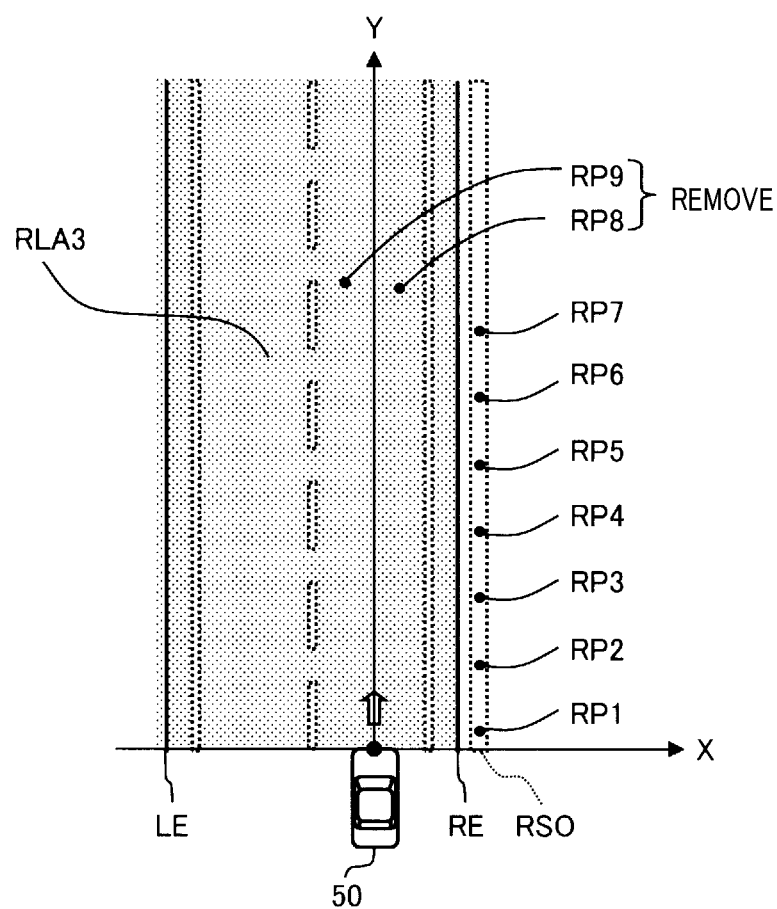
FIG. 7 is an explanatory diagram of a setting example of a travel road area using a road edge.

In the example in FIG. 7, the road edges LE and RE are recognized through image processing of the image captured by the camera 412. In this case, an area on the left side of the road edge RE recognized on the right side of the own vehicle 50 is set as the travel road area RLA3. The reflection point correcting unit 226 removes the reflection points RP8 and RP9 that are present in the travel road area RLA3 from the reflection-point group. As a result, the reflection-point group of the reflection points RP1 to RP7 of the roadside object RSO can be accurately recognized.

Figure 8:
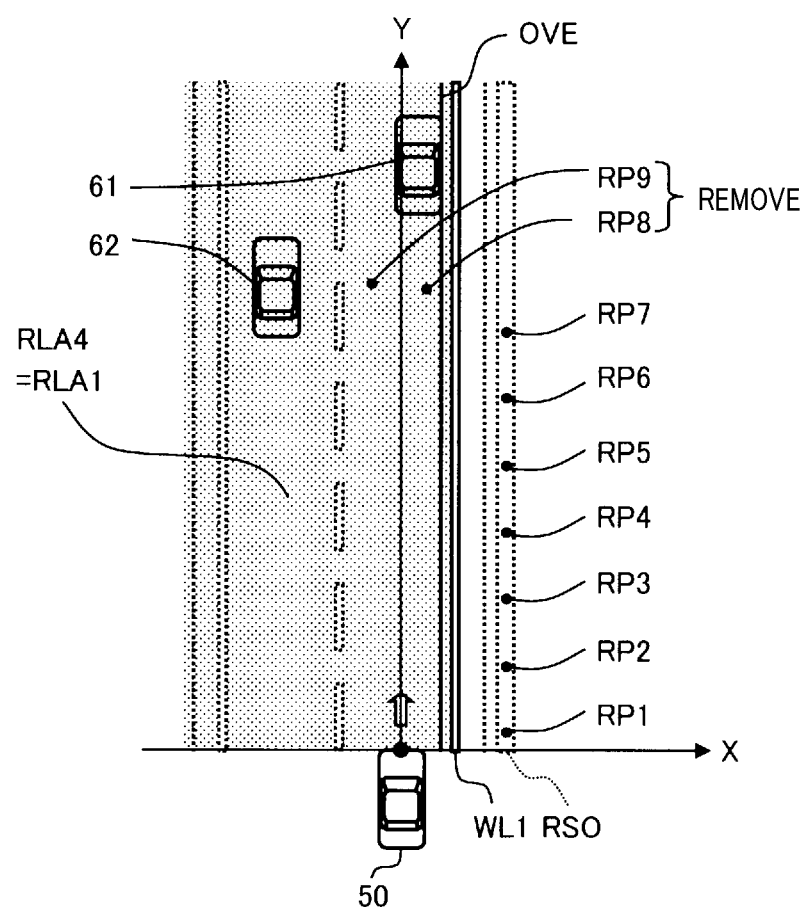
FIG. 8 is an explanatory diagram of a setting example of a travel road area using the travel road boundary line and the other vehicle locus.

In the example in FIG. 8, the travel road boundary line WL1 that is the reference object used in FIG. 5 (method 1) and the locus of the other vehicle 61 that is the reference object used in FIG. 6 (method 2) are recognized. In cases in which a plurality of reference objects that can be used to set the travel road area are present in this manner, the travel road area is preferably set using the reference object with which the widest travel road area can be obtained, among the plurality of reference objects.

That is, in the example in FIG. 8, of the area (RLA1 in FIG. 5) on the left side of the travel road boundary line WL1 present furthest to the right among the travel road boundary lines recognized on the right side of the own vehicle 50 and the area (RLA2 in FIG. 6) on the left side of the locus of the other vehicle 61 present furthest to the right among the other vehicles 61 recognized on the right side of the own vehicle 50, the wider area is set as the travel road area RLA4. In this case as well, the reflection point correcting unit 226 removes the reflection points RP8 and RP9 that are present in the travel road area RLA4 from the reflection-point group. As a result, the reflection-point group of the reflection points RP1 to RP7 of the roadside object RSO can be accurately recognized.

The travel road area corresponding to each reference object is determined based on predetermined rules for each reference object. In the example in FIG. 8, instead of the widest area among the plurality of travel road areas RLA1 and RLA2 set using a plurality of reference objects being selected as the travel road area RLA4, a sum area of the areas RLA1 and RLA2 may be set as the travel road area to be used for removal of the reflection points.

In FIG. 5 to FIG. 8, described above, the travel road area that includes the travel road on which the own vehicle 50 travels is set through image processing of the image captured by the camera 412. The reflection points present in the travel road area are determined to be highly likely not to be the reflection points of the roadside object RSO and are removed from the reflection-point group. However, the reflection points determined to be highly likely not to be the reflection points of the roadside object RSO may be selected and removed through a method other than the method in which the travel road area is set.

For example, as can be understood from FIG. 3, in the image captured by the camera 412, the roadside object RSO is often an object that extends from the left side or the right side of the screen towards a vanishing point in the image. Therefore, the reflection points that are unlikely to be the reflection points of such an object may be removed from the reflection-point group.

Figure 9:
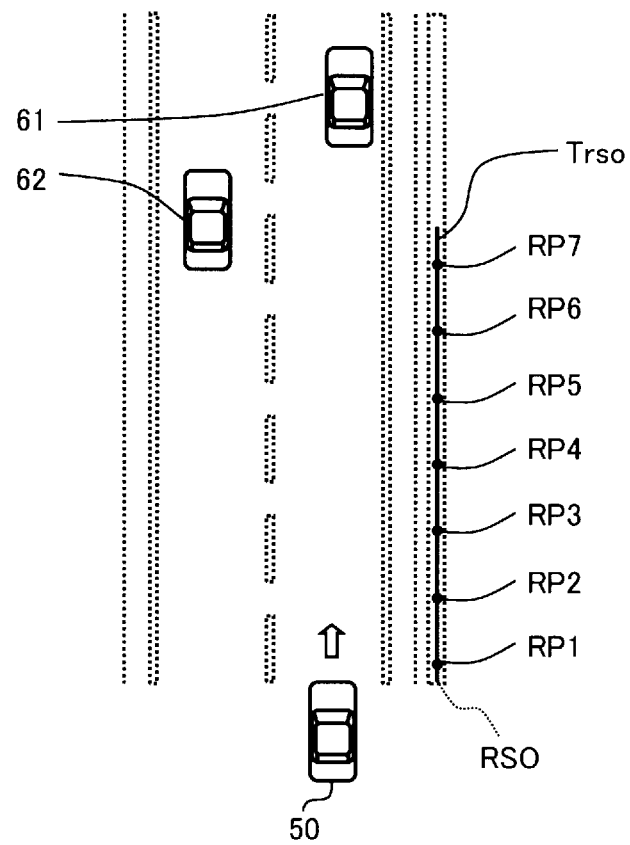
FIG. 9 is an explanatory diagram of a process for recognizing a roadside object from a corrected reflection-point group.

As shown in FIG. 9, when the reflection-point group is corrected as a result of the unnecessary reflection points RP8 and RP9 being removed from the reflection-point group RP1 to RP9, at step S140 in FIG. 4, the shape recognizing unit 228 recognizes the shape of the roadside object RSO using the corrected reflection-point group RP1 to RP7.

Specifically, the shape recognizing unit 228 recognizes the two-dimensional shape of the roadside object RSO by successively connecting the reflection points in the corrected reflection-point group RP1 to RP7. A technology for recognizing the shape of the roadside object RSO from the reflection-point group is known. Therefore, a detailed description thereof is omitted herein.

At step S150, the travel road shape calculating unit 230 calculates the travel road shape using the recognized roadside object RSO. Specifically, the travel road shape calculating unit 230 calculates the shape (travel road shape) of the travel road on which the own vehicle 50 travels from the shapes of the roadside object RSO and other objects (such as the travel road boundary lines WL1 to WL3). The automatic driving control unit 210 performs automatic driving of the own vehicle 50 using the travel road shape calculated in this manner.

As described above, according to the first embodiment, the reflection-point group is corrected by the reflection points determined to be highly likely not to be the reflection points of the roadside object RSO being removed from the reflection-point group through image processing of the image captured by the camera 412. The shape of the roadside object RSO is then recognized through use of the corrected reflection-point group.

That is, according to the first embodiment, the reflection points that are highly likely not to be the reflection points of the roadside object RSO are removed from the reflection-point group through use of the results of image processing performed on the image of the travel route. Therefore, the noise points can be appropriately removed. The likelihood of the shape of the roadside object RSO being erroneously recognized can be reduced.

B. Second Embodiment

According to a second embodiment, when an object in an image captured by the camera 412 is recognized as being the overhead object UOB (FIG. 3) through image processing of the image, a process shown in FIG. 10, described below, is performed in addition to the above-described processes (FIG. 5 to FIG. 8) according to the first embodiment.

For example, the method for recognizing the overhead object UOB of the own vehicle 50 in an image includes pattern matching between the object in the image and numerous template images of overhead objects registered in advance. Alternatively, an object in the image can be recognized through use of artificial intelligence to which machine learning has been applied, and the object can be recognized as an overhead object should the object be present above the vanishing point in the image.

Moreover, when the GNSS signal cannot be detected, the likelihood of an overhead structure, such as an overpass or the ceiling of a tunnel, being present is high. Therefore, a determination that an overhead structure is present may be made. However, in the latter case, as described hereafter, an area that is beyond a distance (such as a value ranging from 50 meters to 60 meters) set in advance is preferably set as an overhead object area UA1.

Figure 10:
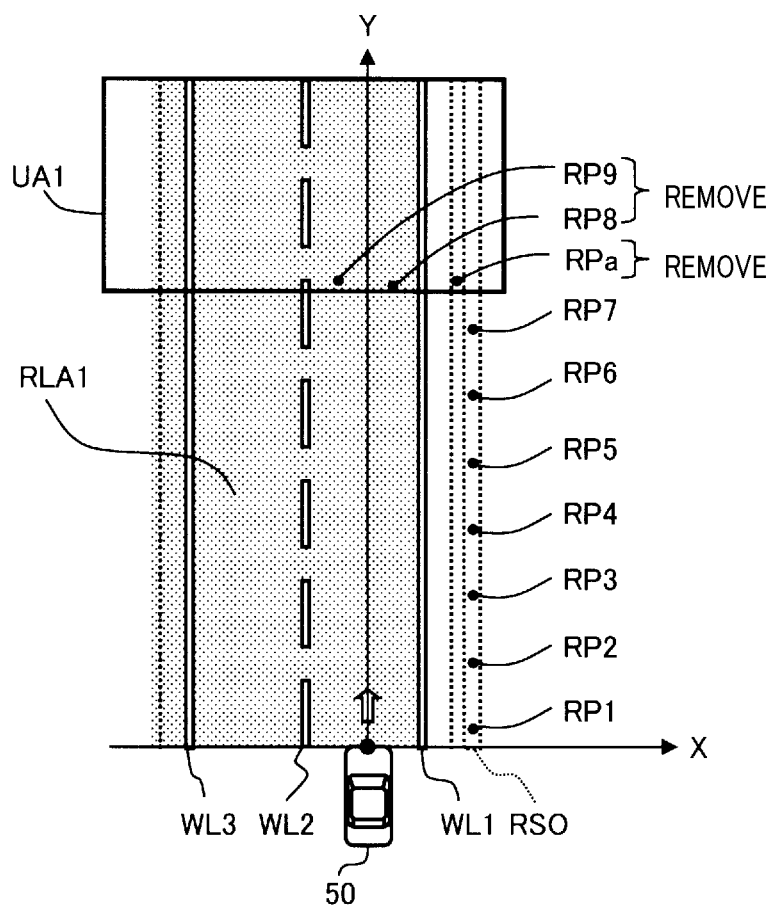
FIG. 10 is an explanatory diagram of an example of a method for setting the travel road area using a recognized overhead object.

As shown in FIG. 10, when an object in the image is recognized as being the overhead object UOB of the own vehicle 50, an overhead object area UA1 in which the overhead object UOB is assumed to be present is set. The reflection points RPa, RP8, and RP9 that are present in the overhead object area UA1 are then removed from the reflection-point group. FIG. 10 also shows the travel road area RLA1 that has been set in the process in FIG. 5. Among the three reflection points RPa, RP8, and RP9 removed from the reflection-point group in the process in FIG. 10, the reflection point RPa is outside of the travel road area RLA1. Therefore, the reflection point RPa cannot be removed in the process in FIG. 5.

For example, the reflection point RPa corresponds to the reflection of electromagnetic waves from a column of the overhead object UOB in the image shown in FIG. 3. In such cases as well, should the overhead object area UA1 in which the overhead object UOB is assumed to be present be set, and the reflection points RPa, RP8, and RP9 present in the overhead object area UA1 be removed from the reflection-point group, the shape of the roadside object RSO can be more accurately recognized.

The overhead object area UA1 in which the overhead object UOB is assumed to be present can be set through various methods. According to the second embodiment, the overhead object area UA1 is set as an area beyond a position at which the overhead object UOB is calculated or estimated to be present. For example, when the camera 412 is a stereo camera, the distance to the overhead object UOB from the own vehicle 50 can be calculated from the image captured by the stereo camera. The area extending beyond the calculated distance can be set as the overhead object area UA1.

In addition, when the camera 412 is a single-lens camera, the distance to the overhead object UOB can be estimated based on the coordinates of the overhead object UOB in the image captured by the camera 412, the coordinates of the reflection points of the overhead object UOB measured by the radar 414, and the distance to the reflection points. The area extending beyond this distance can be set as the overhead object area UA1. Alternatively, in cases in which the position at which the overhead object UOB is present cannot be calculated or estimated, an area beyond a distance (such as a value ranging from 50 meters to 60 meters) set in advance may be set as the overhead object area UA1.

As described above, according to the second embodiment, when the overhead object UOB (such as a destination guidance sign or an elevated road) is recognized as being present above the travel road on which the own vehicle 50 travels, the overhead object area UA1 in which the overhead object UOB is assumed to be present is set. The reflection points present in the overhead object area UA1 are then removed from the reflection-point group. As a result, the likelihood of the overhead object UOB being erroneously recognized as the roadside object RSO can be reduced.

C. Third Embodiment

According to a third embodiment, when an object in an image captured by the camera 412 is recognized as being the overhead object UOB (FIG. 3) through image processing the image, a process shown in FIG. 11, described below, is performed in addition to the above-described processes (FIG. 5 to FIG. 8) according to the first embodiment. In a manner similar to the process in FIG. 10, the process in FIG. 11, described hereafter, is a process in which an overhead object area UA2 in which the overhead object UOB is assumed to be present is set. The reflection points RPa, RP8, and RP9 present in the overhead object area UA2 are then removed from the reflection-point group. The third embodiment differs from the second embodiment in terms of the setting method of the overhead object area UA2.

Figure 11:
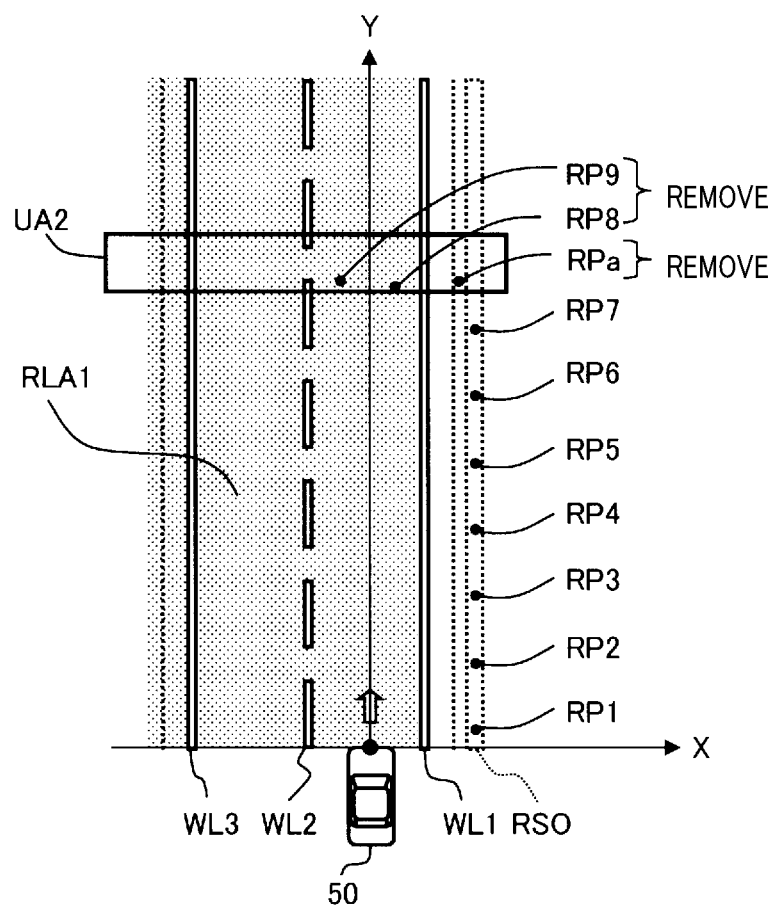
FIG. 11 is an explanatory diagram of another example of the method for setting the travel road area using a recognized overhead object.

As shown in FIG. 11, according to the third embodiment, the overhead object area UA2 is set as an area within a predetermined distance from the position at which the overhead object UOB is calculated or estimated to be present. For example, when the camera 412 is a stereo camera, the position of the overhead object UOB can be calculated from the image captured by the stereo camera. The area within a predetermined distance (such as 2 meters) from the calculated position can then be set as the overhead object area UA2.

In addition, when the camera 412 is a single-lens camera, a three-dimensional position of the overhead object UOB can be estimated based on the coordinates of the overhead object UOB in the image captured by the camera 412, the coordinates of the reflection points of the overhead object UOB measured by the radar 414, and the distance to the reflection points. The area within a predetermined distance from the estimated position can then be set as the overhead object area UA2. According to the third embodiment as well, effects similar to those according to the second embodiment can be achieved.

D. Fourth Embodiment

Figure 12:
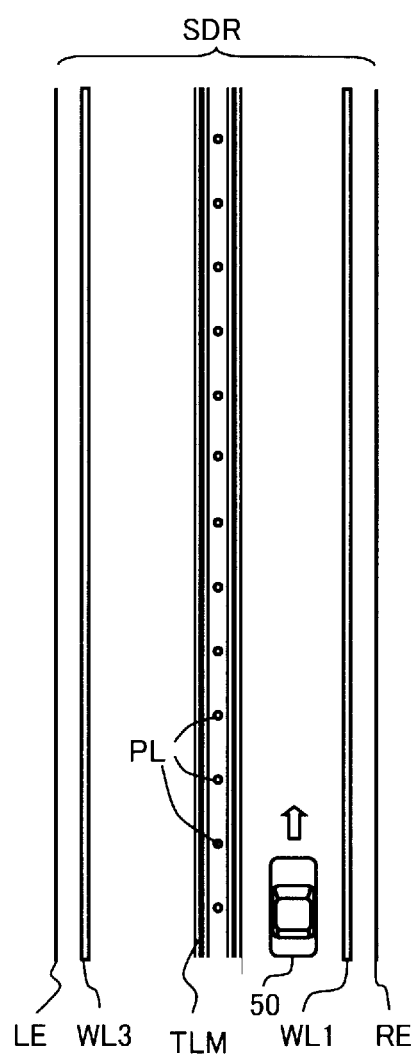
FIG. 12 is an explanatory diagram of a road including a temporary boundary line.

In an example shown in FIG. 12, the travel route SDR includes a temporary boundary line TLM. The temporary boundary line TLM is a boundary line that indicates that the section of road is a temporary travel section. For example, the temporary boundary line TLM is drawn on the road surface as a composite line including a white line and a yellow line.

In addition, a row of poles PL is often set within the area of the temporary boundary line TLM. When the reflection point correcting unit 226 recognizes the temporary boundary line TLM, the recognition can be performed through use of other features (such as the left side being a solid white line, the lane width being narrow, or a vertically aligned edge-point group [a point group of the row of poles PL or the like] being continuously present), in addition to the feature that is the boundary line being the composite line including the white line and the yellow line. According to the fourth embodiment, a process that is performed when the row of poles PL is recognized as the roadside object will be described.

Figure 13:
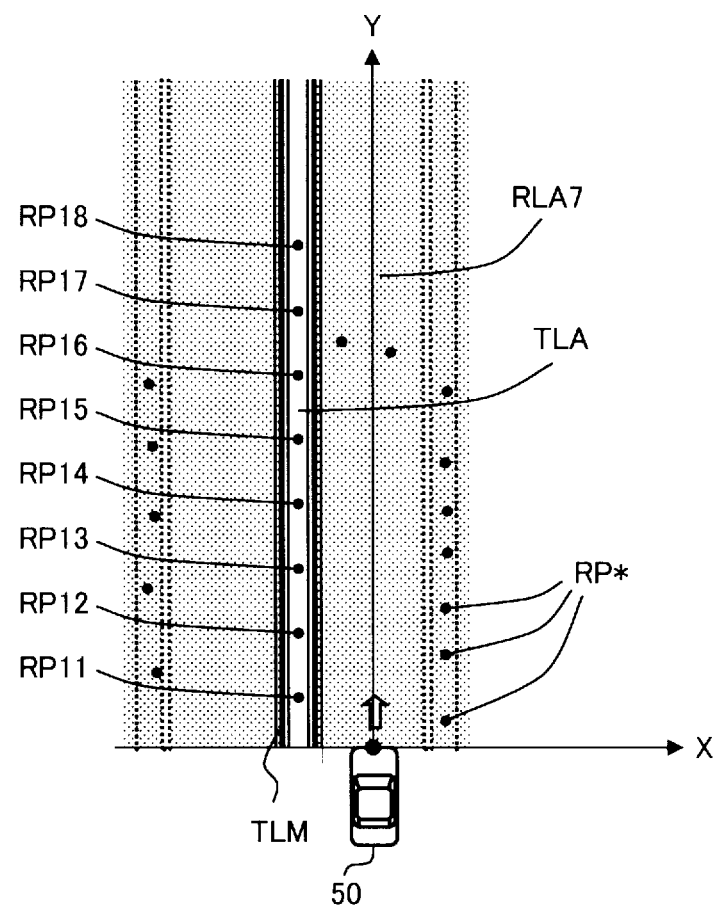
FIG. 13 is an explanatory diagram of a method for excluding reflection points using the temporary boundary line.

In the example shown in FIG. 13, the reflection-point group obtained by the radar 414 includes reflection points RP11 to RP18 that correspond to the row of poles PL in FIG. 12, and reflection points RP* that are obtained from another roadside object. The reflection point correcting unit 226 determines whether or not the temporary boundary line TLM is included in the image captured by the camera 412. When determined that the temporary boundary line TLM is included in the image, the reflection point correcting unit 226 sets an area RLA7 other than a temporary boundary line area TLA that includes the temporary boundary line TLM.

For example, the temporary boundary line area TLA can be set as an area that circumscribes the temporary boundary line TLM. Alternatively, the temporary boundary line area TLA may be set as an area obtained by a margin of a predetermined width (such as 40 centimeters to 60 centimeters) being provided on the outer side of the area circumscribing the temporary boundary line TLM. The reflection point correcting unit 226 removes the reflection points RP* that are present in the area RLA7 from the reflection-point group.

As described above, when the temporary boundary line TLM is included in the image captured by the camera 412, should the reflection points RP* present in the area RLA7 other than the temporary boundary line TLM be removed from the reflection-point group, the roadside object such as the row of poles PL included in the area of the temporary boundary line TLM can be accurately recognized.

In particular, this process is greatly effective in terms of enabling the roadside object included in the area of the temporary boundary line TLM to be accurately recognized in a location in which significant noise is present among the reflection points, such as inside a tunnel. Correction of the reflection-point group according to the fourth embodiment is also a type of process for removing the reflection points determined to be highly likely not to be the reflection points of a roadside object from the reflection-point group through image processing of the image.

The present disclosure is not limited to the above-described embodiments. Various modes are possible without departing from the spirit of the present disclosure.

What is claimed is:

1. A roadside object recognition apparatus that recognizes a roadside object that is present on a travel route on which an own vehicle travels, the roadside object being used for driving control of the own vehicle, the roadside object recognition apparatus comprising:
    a reflection point acquiring unit that acquires, using a radar that emits electromagnetic waves, a reflection-point group of reflection points of the electromagnetic waves reflected by an object that is present on the travel route;
    an image acquiring unit that acquires, using a processor, an image of the travel route using a camera;
    a reflection point correcting unit that converts, using the processor, positions of the reflection points configuring the reflection-point group to positions in the image acquired by the image acquiring unit, and corrects, using the processor, the reflection-point group by removing an erroneous reflection point that is determined to be highly likely not to be a reflection point of the roadside object from the reflection-point group of the reflection points in the image through image processing of the image; and
    a shape recognizing unit that recognizes a shape of the roadside object using the corrected reflection-point group.

2. The roadside object recognition apparatus according to claim 1, wherein:
    the reflection point correcting unit sets a travel road area that includes a travel road on which the own vehicle travels in the image and removes the erroneous reflection point present in the travel road area from the reflection-point group.

3. The roadside object recognition apparatus according to claim 1, wherein:
    when a temporary boundary line that is a boundary line indicating a temporary travel section is included in the image, the reflection point correcting unit removes the erroneous reflection point present in an area other than a temporary boundary line area including the temporary boundary line from the reflection-point group.

4. The roadside object recognition apparatus according to claim 2, wherein:
    when a temporary boundary line that is a boundary line indicating a temporary travel section is included in the image, the reflection point correcting unit removes the erroneous reflection point present in an area other than a temporary boundary line area including the temporary boundary line from the reflection-point group.

5. The roadside object recognition apparatus according to claim 2, wherein:

when an overhead object that is recognized as being present above the travel road on which the own vehicle travels is included in the image, the reflection point correcting unit sets an overhead object area in which the overhead object is assumed to be present and removes the erroneous reflection point present in the overhead object area from the reflection-point group.

6. The roadside object recognition apparatus according to claim 5, wherein:
when a temporary boundary line that is a boundary line indicating a temporary travel section is included in the image, the reflection point correcting unit removes the erroneous reflection point present in an area other than a temporary boundary line area including the temporary boundary line from the reflection-point group.

7. The roadside object recognition apparatus according to claim 2, wherein:
when a plurality of reference objects that can be used for setting the travel road area are recognized, the reflection point correcting unit sets the travel road area using the reference object with which a widest travel road area can be obtained, among the plurality of reference objects.

8. The roadside object recognition apparatus according to claim 7, wherein:
when an overhead object that is recognized as being present above the travel road on which the own vehicle travels is included in the image, the reflection point correcting unit sets an overhead object area in which the overhead object is assumed to be present and removes the erroneous reflection point present in the overhead object area from the reflection-point group.

9. The roadside object recognition apparatus according to claim 7, wherein:
when a temporary boundary line that is a boundary line indicating a temporary travel section is included in the image, the reflection point correcting unit removes the erroneous reflection point present in an area other than a temporary boundary line area including the temporary boundary line from the reflection-point group.

10. The roadside object recognition apparatus according to claim 2, wherein:
when a plurality of reference objects that can be used for setting the travel road area are recognized, the reflection point correcting unit sets a sum area of a plurality of areas set using the plurality of reference objects as the travel road area.

11. The roadside object recognition apparatus according to claim 10, wherein:
when an overhead object that is recognized as being present above the travel road on which the own vehicle travels is included in the image, the reflection point correcting unit sets an overhead object area in which the overhead object is assumed to be present and removes the erroneous reflection point present in the overhead object area from the reflection-point group.

12. The roadside object recognition apparatus according to claim 10, wherein:
when a temporary boundary line that is a boundary line indicating a temporary travel section is included in the image, the reflection point correcting unit removes the erroneous reflection point present in an area other than a temporary boundary line area including the temporary boundary line from the reflection-point group.

13. A vehicle control system comprising:
a roadside object recognition apparatus that recognizes a roadside object that is present on a travel route on which an own vehicle travels; and
a control apparatus that performs driving control of the own vehicle based on the roadside object recognized by the roadside object recognition apparatus,
the roadside object recognition apparatus comprising:
a reflection point acquiring unit that acquires, using a radar that emits electromagnetic waves, a reflection-point group of reflection points of the electromagnetic waves reflected by an object that is present on the travel route;
an image acquiring unit that acquires an image of the travel route using a camera;
a reflection point correcting unit that converts, using a processor, positions of the reflection points configuring the reflection-point group to positions in the image acquired by the image acquiring unit, and corrects, using the processor, the reflection-point group by removing an erroneous reflection point that is determined to be highly likely not to be a reflection point of the roadside object from the reflection-point group of the reflection points in the image through image processing of the image; and
a shape recognizing unit that recognizes, using the processor, a shape of the roadside object using the corrected reflection-point group.

14. A computer-implemented roadside object recognition method for recognizing a roadside object that is present on a travel route on which an own vehicle travels, the roadside object being used for driving control of the own vehicle, the roadside object recognition method comprising:
acquiring, using a radar that emits electromagnetic waves, a reflection-point group of reflection points of the electromagnetic waves reflected by an object that is present on the travel route;
acquiring an image of the travel route using a camera;
converting positions of the reflection points configuring the reflection-point group to positions in the image acquired by the image acquiring unit;
correcting the reflection-point group by removing an erroneous reflection point that is determined to be highly likely not to be a reflection point of the roadside object from the reflection-point group of the reflection points in the image through image processing of the image; and
recognizing a shape of the roadside object using the corrected reflection-point group.

* * * * *